(12) United States Patent
Heilig et al.

(10) Patent No.: US 7,331,701 B2
(45) Date of Patent: Feb. 19, 2008

(54) GEARBOX FOR CONCRETE MIXER

(75) Inventors: Eduard Heilig, Friedrichshafen (DE);
Andreas Geier, Jandelsbrunn (DE);
Klaus Schiffner, Bad Neuenahr-Ahrweiler (DE); Michael Frondorf, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 291 days.

(21) Appl. No.: 11/051,886

(22) Filed: Feb. 4, 2005

(65) Prior Publication Data

US 2006/0176133 A1    Aug. 10, 2006

(51) Int. Cl.
*B28C 5/42* (2006.01)

(52) U.S. Cl. .................................................. 366/63

(58) Field of Classification Search .................. 366/44, 366/62, 63, 220, 226–228; 494/82; 248/573, 248/580, 581, 599, 602, 634, 635
See application file for complete search history.

(56) References Cited

U.S. PATENT DOCUMENTS

| | | | | |
|---|---|---|---|---|
| 186,570 A | * | 1/1877 | Huffman | 248/599 |
| 2,265,053 A | * | 12/1941 | Anderson | 248/634 |
| 2,511,240 A | * | 6/1950 | Bohmer et al. | 366/60 |
| 2,895,722 A | * | 7/1959 | Hunkins | 366/63 |
| 3,756,572 A | * | 9/1973 | Buelow et al. | 366/61 |
| 3,785,622 A | * | 1/1974 | Johnson | 366/63 |
| 3,825,232 A | * | 7/1974 | Pecorari | 366/62 |
| 4,378,163 A | * | 3/1983 | Jameson et al. | 366/63 |
| 4,425,813 A | * | 1/1984 | Wadensten | 74/87 |
| 4,453,830 A | * | 6/1984 | Jameson et al. | 366/63 |
| 4,575,254 A | * | 3/1986 | Johnston | 366/62 |
| 5,149,126 A | * | 9/1992 | Brennan | 280/86.5 |
| 5,820,258 A | * | 10/1998 | Braun | 366/63 |

FOREIGN PATENT DOCUMENTS

| | | |
|---|---|---|
| DE | 31 21 797 A1 * | 12/1982 |
| DE | 100 33 661 A1 | 1/2002 |
| WO | WO 2006/015833 A1 * | 2/2006 |
| WO | WO 2006/015839 A1 * | 2/2006 |
| WO | WO 2006/131335 A2 * | 12/2006 |

\* cited by examiner

*Primary Examiner*—David Sorkin
(74) *Attorney, Agent, or Firm*—Davis Bujold & Daniels, P.L.L.C.

(57) ABSTRACT

A drive for a mixing drum has a compensating device (25) for the purpose of compensating the motions between a drum (1) and a bearing bracket (4), which consists of a first component (20), an elastic element (17), and a second component (16).

14 Claims, 8 Drawing Sheets

GEARBOX FOR CONCRETE MIXER

FIELD OF THE INVENTION

The invention concerns a drive for a mixing drum.

BACKGROUND OF THE INVENTION

DE 100 33 661 A1 discloses a drive for a mixing drum in which a driving motor drives an internal bull gear of a planetary step, the outer bull gear of which forms the output and drives the mixing drum. The mixing drum is rotatably mounted by way of a bearing in the housing that is supported by a bearing bracket. The bearing is designed as a spherical roller bearing in order to compensate for motions between the bearing bracket and the mixing drum. Since the drum develops both an axial and a radial force component, which act upon the spherical roller bearing, due to the weight of its content and the installation angle, the row of spherical roller bearings which, in addition, has to absorb the axial force of the mixing drum, is further strained, which leads to an enlargement of the spherical roller bearing in order to provide the bearing with a design that is reliable in operation.

It is the object of the invention to create a drive for a mixing drum, which drives and pivotally supports the mixing drum and herewith compensates, in a safe way, for motions between the mixing drum and around the bearing bracket, wherein the drive should have a compact design.

SUMMARY OF THE INVENTION

The drive for the mixing drum comprises a compensator, according to the invention, which is included for the purpose of compensating for motions between the mixing drum and the bearing bracket, wherein the compensating device consists of elastic material, which co-acts in such a way with a first and a second component that the forces of the drum can be transmitted in an embodiment of the invention The second component that co-acts with the elastic material is designed as one piece with the housing of the drive for the mixing drum. It is possible to connect the elastic material to the second component, for example, with the aid of an adhesive or by vulcanization. But it is also possible to only place the elastic material loosely in the second component, since the weight of the mixing drum causes a permanent force to act from the second component onto the elastic element. It is also possible to configure the second component in such a way that it can be connected via connecting elements to the housing of the drive for the mixing drum.

In another embodiment, the second component has a pot-shaped configuration and encloses the elastic material. In order to be able to better absorb the axial forces of the mixing drum, the pot-shaped second component is configured in such a way, in the area facing the mixing drum, that a large axial contact surface is formed for the elastic element, whereby the axial forces of the mixing drum can be transmitted onto the elastic element if the surface pressure is constant.

The elastic element is supported by a first component on which it either rests or to which it is connected by means of an adhesive bond or a vulcanization bond, wherein the first component is connected in a fixed manner via connecting elements to the bearing bracket of the vehicle. It is also possible to configure the bearing bracket as one piece with the first component.

In another embodiment, the first component has, likewise, an enlarged surface on which the elastic element can rest in the axial area, which is directed in the direction of the mixing drum.

In a further embodiment, the first component has a projection by which the axial forces of the mixing drum can be directed to the bearing bracket without causing a strain due to the axial forces on the connecting elements with which the first component is connected to the bearing bracket.

In another embodiment, the elastic element has, in addition, at least one metallic insert which stabilizes the elastic element. This metallic insert is preferably arranged in the pot walls if the elastic element has a pot-shaped configuration.

In a further embodiment, the second component is configured in such a way that it forms a mechanical stop in conjunction with the first component or in conjunction with the bearing bracket and this mechanical stop is configured in such a way that the mixer gear housing can move only within a certain range due to deformation of the elastic element and said elastic range is limited by stops of the second component on the bearing bracket or the first component.

In a further embodiment, said stops are arranged nearly in the center of the second component.

In another embodiment of the invention, the first component has a connecting element which holds the second component on the bearing bracket against the weight of the mixing drum.

By compensating for the motions between the mixing drum and the bearing block with the elastic element, it is possible to configure the bearing via which the mixing drum is rotatably mounted in such a way that it can have a compact design in terms of its dimensions, since this bearing only has to absorb the axial and radial forces of the mixing drum and does not have to perform any additional compensating motions.

In a further embodiment of the invention, this bearing is configured as a tapered roller bearing, wherein the tapered roller bearings are pre-stressed in such a way that both bearing rows are evenly loaded, even in the case of an axial force of the mixing drum. By no longer absorbing the compensating motion of the mixing drum with respect to the bearing bracket within the gear housing, it is possible to provide the reduction gear with the driving motor with a more compact design.

BRIEF DESCRIPTION OF THE DRAWINGS

The invention will now be described, by way of example, with reference to the accompanying drawings in which.

DETAILED DESCRIPTION OF THE INVENTION

Figure 1:
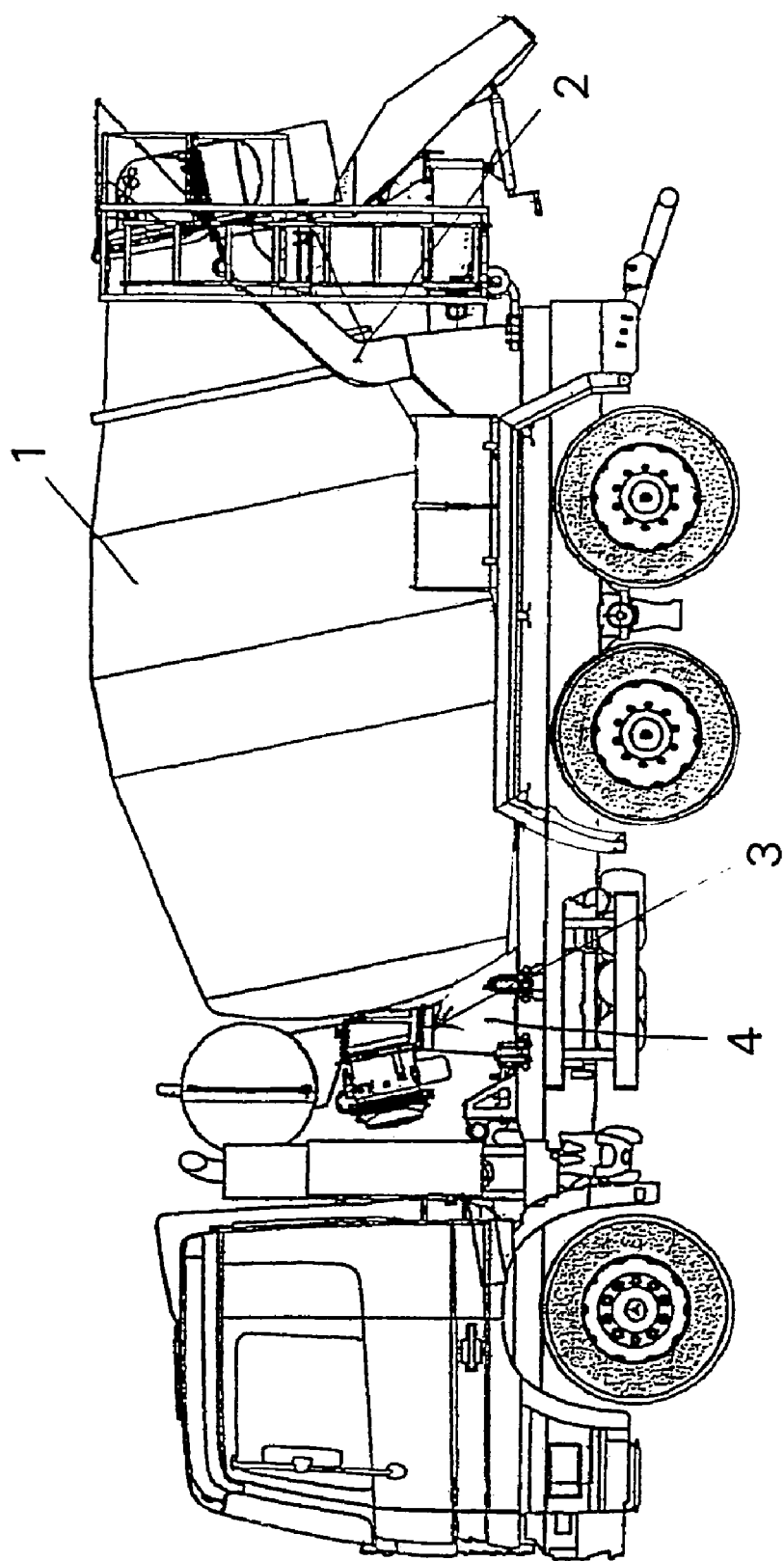
FIG. 1 shows a concrete mixer truck comprising a drive for the mixing drum.
Figure 2:
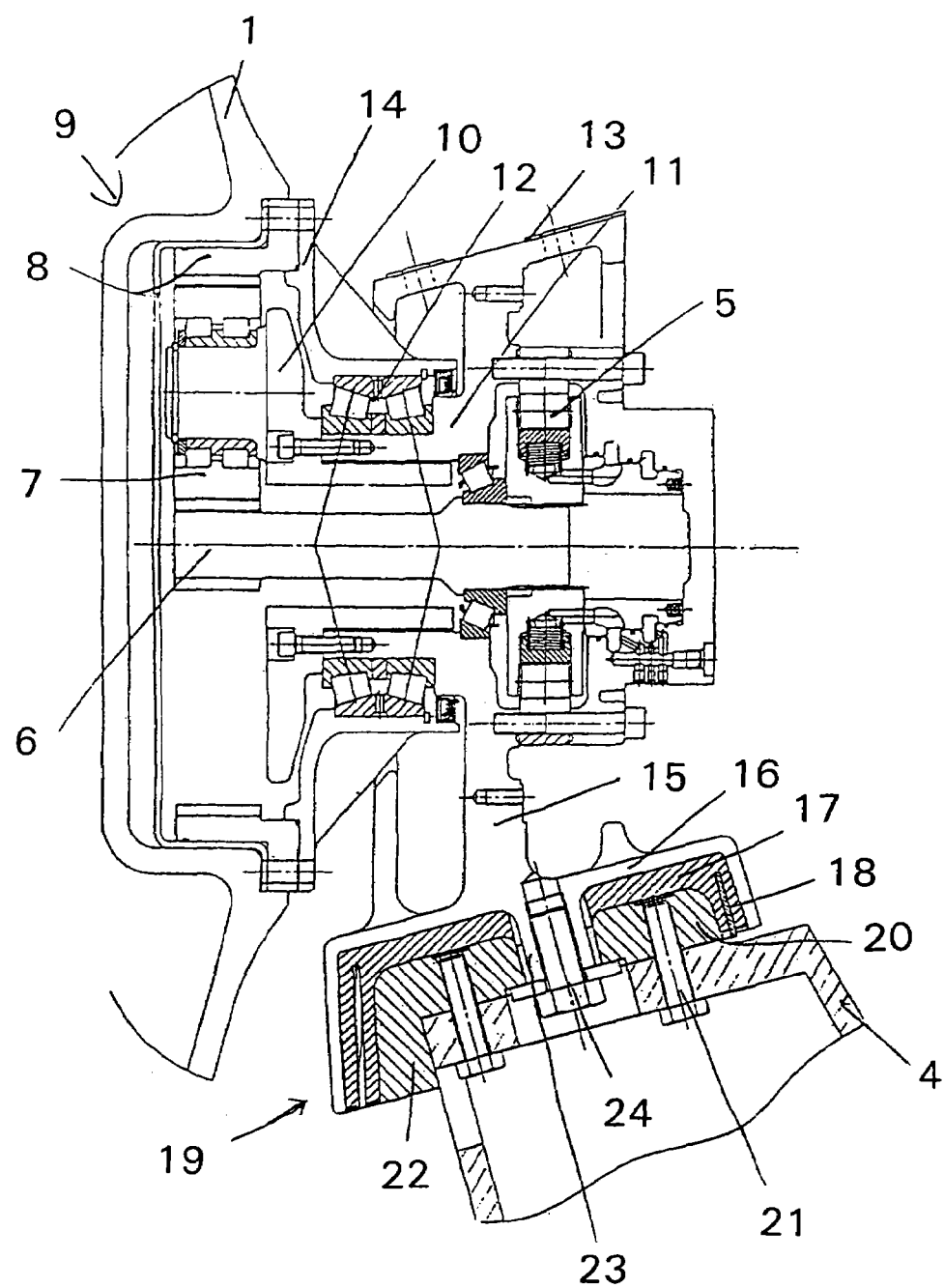
FIG. 2 shows a section view of the drive for the mixing drum.
Figure 3:
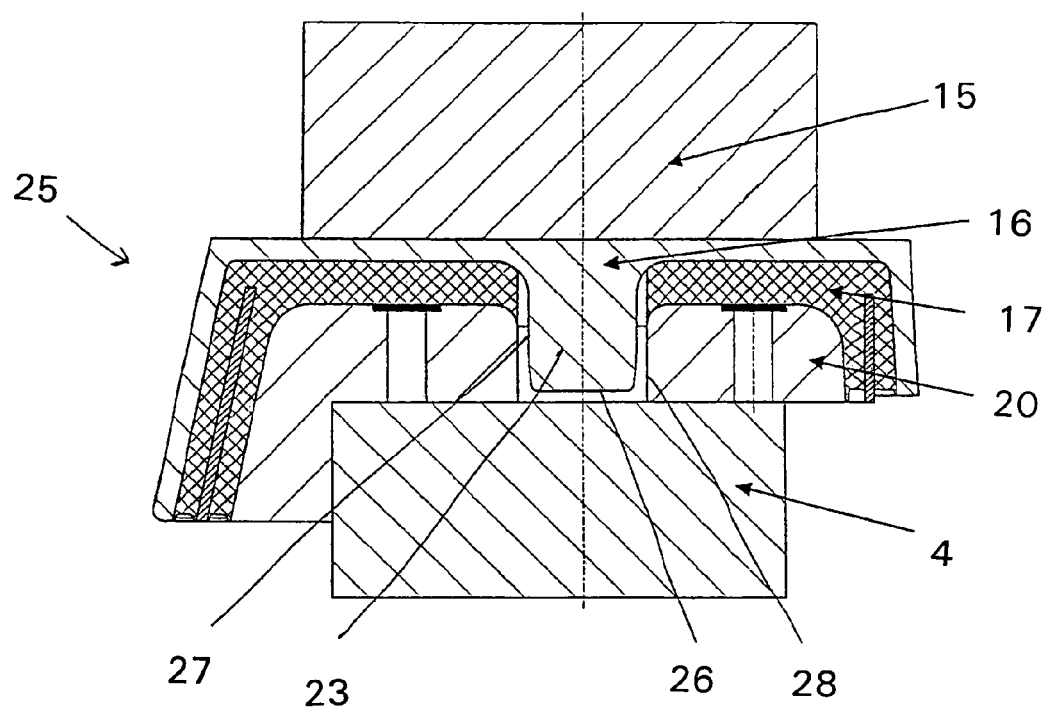
FIG. 3 shows a section view of the compensator.
Figure 4:
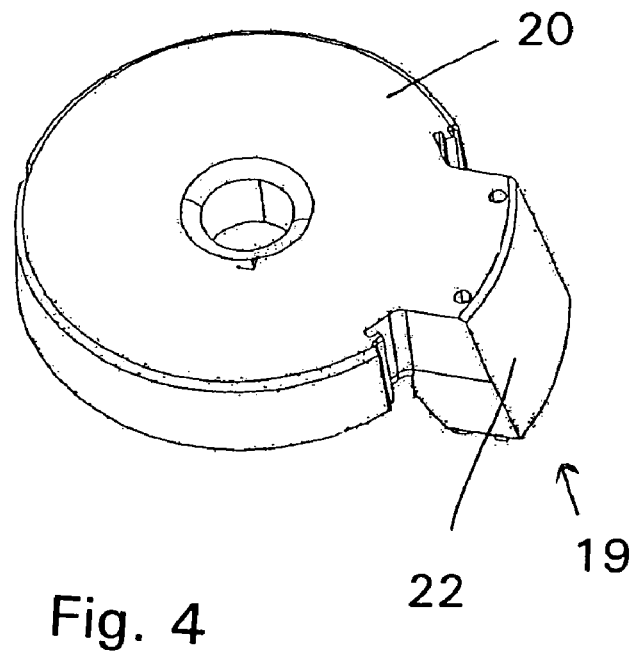
FIG. 4 shows a spatial illustration of the compensator.
Figure 5:
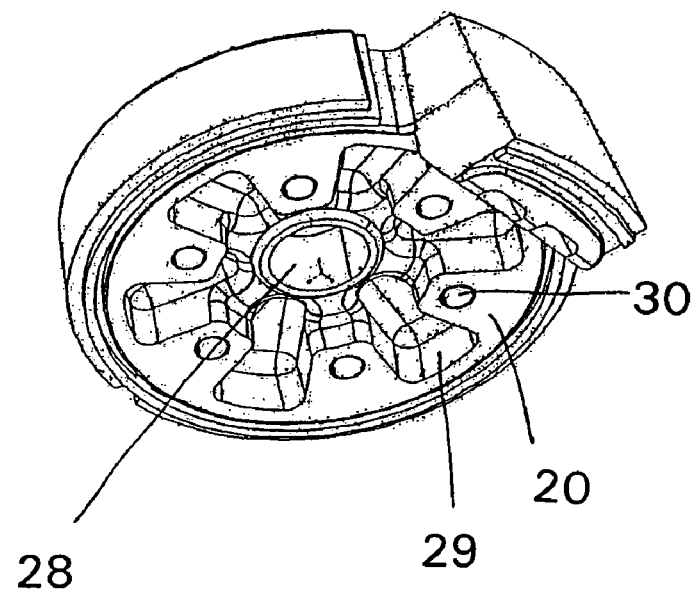
FIG. 5 shows a spatial illustration of the compensator.
Figure 6:
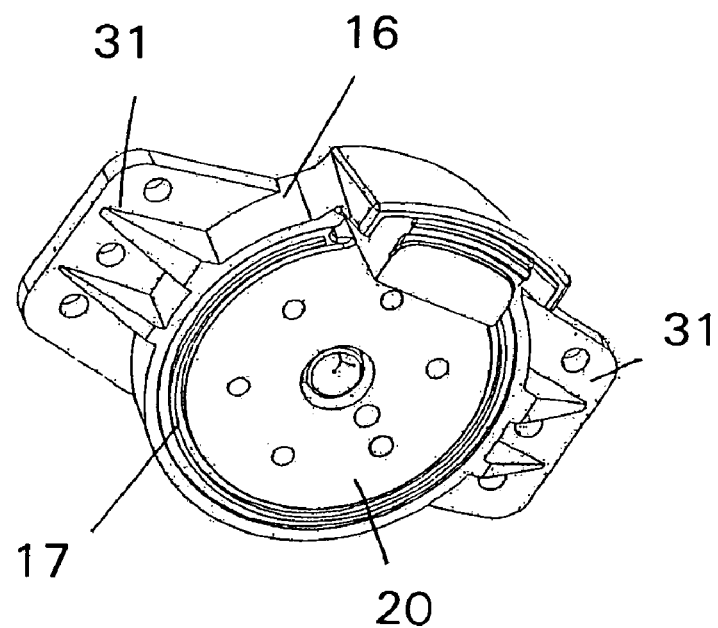
FIG. 6 shows a spatial illustration of the compensating device, which can be connected to the housing.
Figure 7:
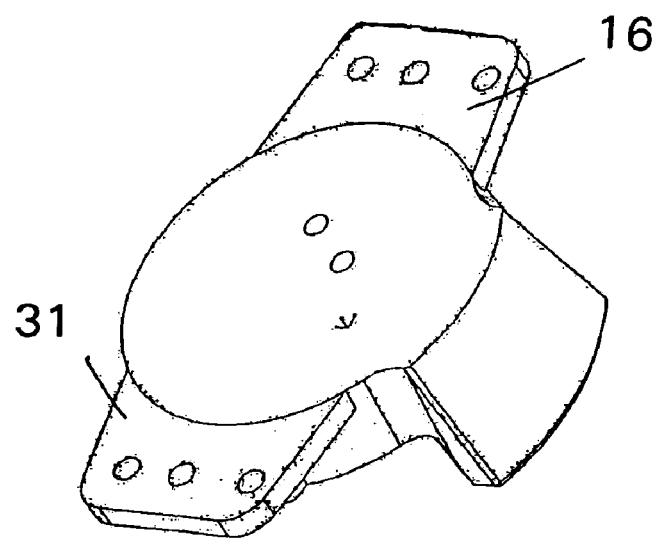
FIG. 7 shows a spatial illustration of the compensator that can be connected to the housing.
Figure 8:
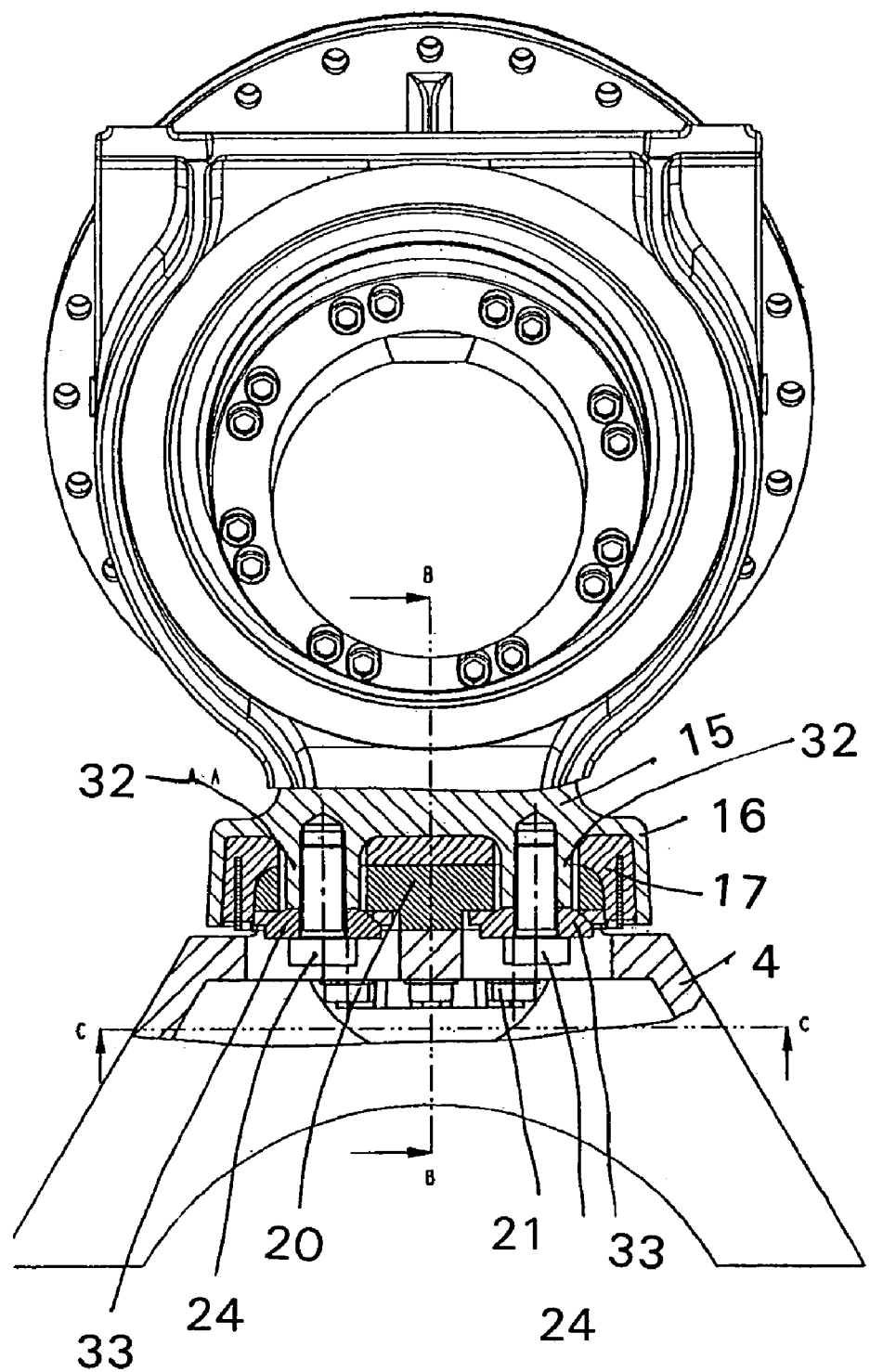
FIG. 8 shows an illustration of the drive with the bearing block seen from the driver's cab of the vehicle.
Figure 9:
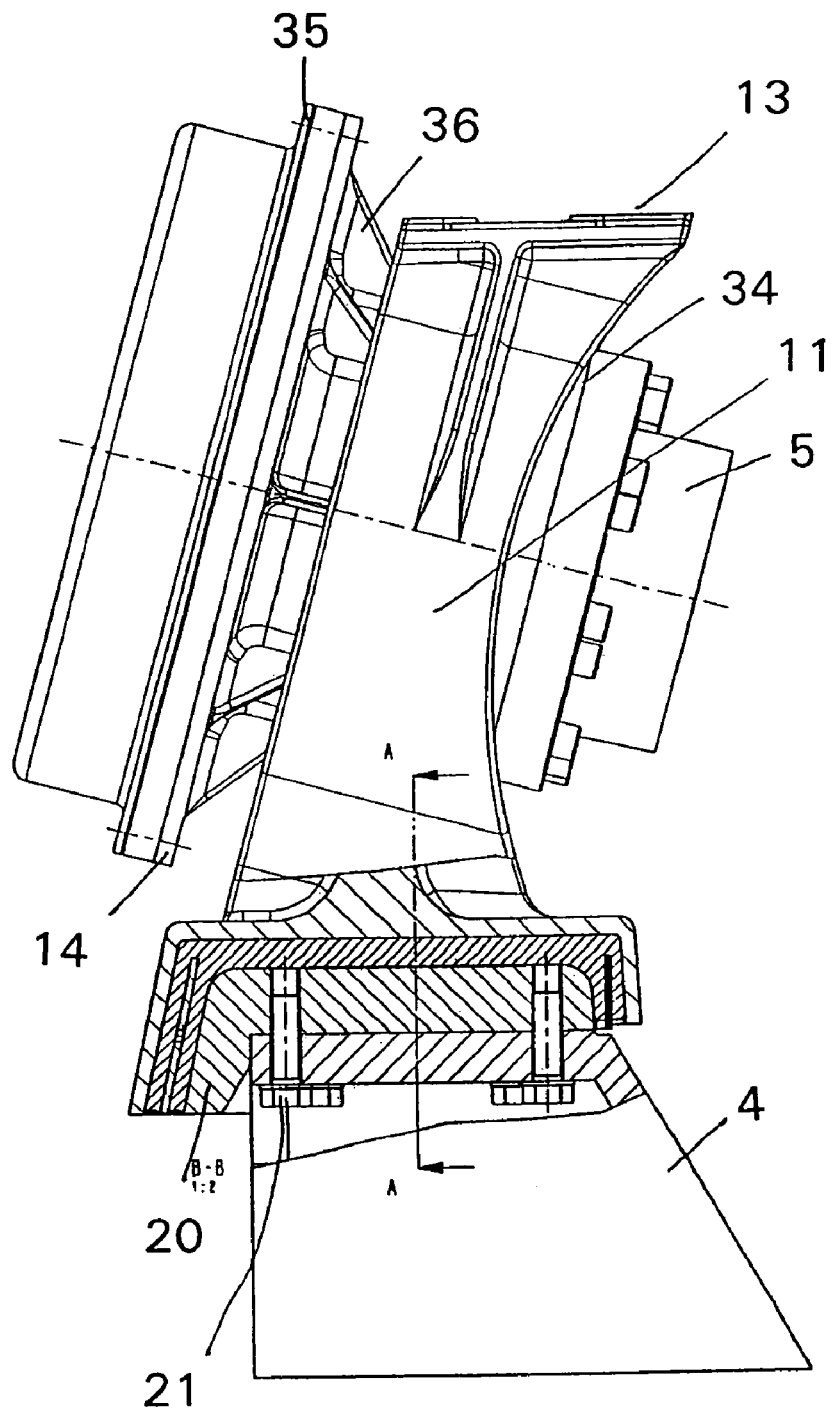
FIG. 9 shows a side view of the drive with the bearing bracket.
Figure 10:
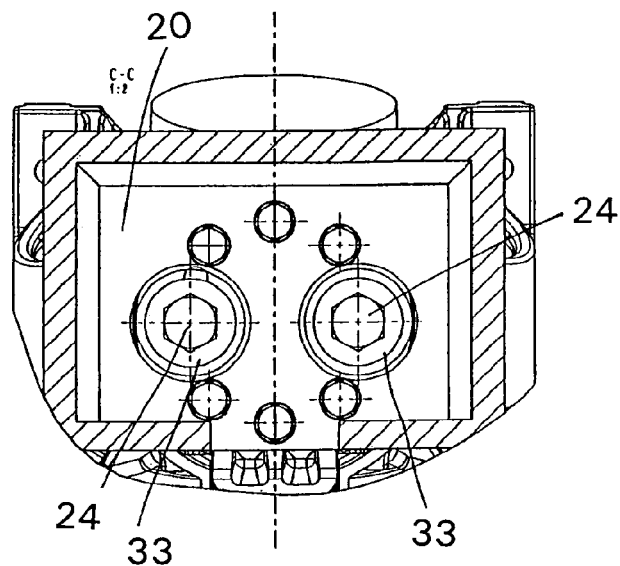
FIG. 10 shows a section view through the bearing bracket.
Figure 11:
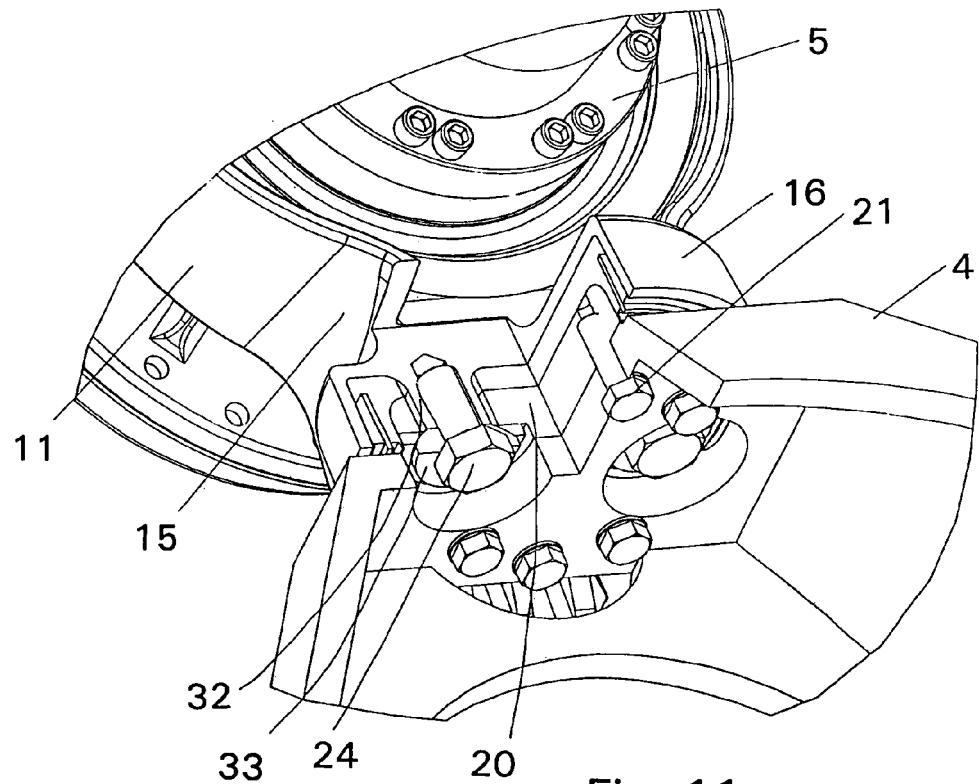
FIG. 11 shows a spatial section view through the bearing bracket.

FIG. 1:

A concrete mixer truck has a drum 1 which is mounted, on the one hand, in two bearing rollers 2 and on the other hand, via a drive 3. The drive 3 drives the drum 1 in a rotational motion, whereby the mix, for example concrete, can be drawn into the drum, mixed or emptied again. The drive is driven in the rotational direction "drawing" or the rotational direction "emptying." The drive absorbs the weight of the mixing drum 1 and transfers it to a bearing bracket 4. The bearing bracket 4 is connected to the frame of the vehicle. Deformations of the vehicle frame occur if the vehicle travels over uneven terrain and these deformations cause the bearing bracket 4 to perform a relative motion with respect to the mixing drum 1.

FIG. 2:

A driving motor 5, preferably a radial piston motor, in particular an outwardly supported radial piston motor, drives an inner bull gear 6, which drives an outer bull gear 8 via spider gears 7. The outer bull gear 8 is connected fixed against rotation to the drum 1 either directly or via a further component.

In one embodiment, a planetary gear 9 is arranged at least in part inside the mixing drum 1. A sun gear 10 is connected fixed against rotation to a housing 11, while a bearing 12 can be arranged between the sun gear 10 and the driving motor 5. The housing 11 has a seat 13, on which, for example a water tank, can be arranged. A flange 14, which is connected against rotation to the drum 1, directs the weight of the drum on the bearing 12, which is supported on the housing 11. The bearing 12 is configured as a tapered roller bearing, which is preferably prestressed in such a way that the two roller rows are evenly loaded. The housing 11 comprises a base 15, which is connected as a single piece to a second component 16. It is also feasible to connect the second component 16 to the base 15 by way of connecting elements. The second component 16 encloses an elastic element 17, which is made, for example, of an elastomer, and has a pot-shaped configuration. In the wall area of the elastic element 17 are embedded metal elements 18, which reinforce the elastic element 17. The elastic element 17 can have the shape of a spherical pot, but it is likewise possible to configure the elastic element 17 in another shape, for example, that of a hexagon or a square or a rectangle. In an area 19 facing the drum 1, the second component 16, the elastic element 17 and the first component 20 have an area in which the wall of the pot is longer than in the other areas. This area 19 is utilized in particular for absorbing the axial forces of the drum 1. The elastic element 17 encloses a first component 20 in a pot-shaped manner and this component is connected to the bearing bracket 4 via connecting elements 21. It is also possible to configure the first component 20 as one piece with the bearing bracket 4. In the area facing the drum 1, in area 19 the first component 20 has a stop 22 in which the axial force of the drum is transmitted to the bearing bracket 4, whereby the connecting elements 21 are not stressed with regard to thrust. The elastic element 17 can be connected to the first component 20, for example, via an adhesive connection or a vulcanization bond, but it is also feasible to allow the elastic element 17 to rest loosely on the first component 20.

In another embodiment, it is likewise possible to configure the wall of the elastic component 17, the second component 16, and the first component 20 with the same length. The connecting elements 21 can be screwed into the first component 20 from the bottom of the vehicle, but it is also possible to screw in the connecting elements 21 from a direction of the top of the vehicle. In the central area of the second component 16, the second component 16 has a pin 23, wherein, on the one hand, said pin prevents excessively strong motions of the elastic element 17 by resting said pin in the first component 20 and, on the other hand, said pin 23 has a connecting element 24, which prevents a lifting of the second component 16 against the weight of the drum 1. There is also the possibility of configuring the second component 16 and the bearing bracket 4 in such a way that a mechanical stop is formed, for example in the area of the pot wall edge to limit the motions.

In a further embodiment, it is possible to connect the outer bull gear 8 fixedly to the housing 11 and the sun gear 10 to the drum, wherein the inner bull gear 6 represents the drive and is connected to the driving motor 5. This arrangement allows the realization of a greater gear ratio in the planetary gear 9 with the same spatial requirement.

FIG. 3:

A compensating device 25 consists of the first component 20, the elastic element 17 and the second component 16. The second component 16 is connected to the base 15 of the housing by way of connecting elements, which are not shown. The first component 20 is connected to the bearing bracket 4 by way of connecting elements, which are not shown. The pin 23 limits the motion of the first component 20 with respect to the second component 16 by allowing a stop surface 26 to rest on the bearing bracket 4 and a ring area 27 to rest in a bore 28 of the first component 20. Forces can be transmitted from the base 15 into the bearing bracket 4 from all directions by configuring the elastic element 17 in a pot shape.

FIG. 4:

In the area 19, the first component 20 has the stop 22, by which the axial force is transmitted to the bearing bracket, which is not shown.

FIG. 5:

The first component 20 has a central bore 28, via which the pin (not shown), can be supported. The first component 20 also has recesses 29, which are arranged between threaded bores 30 in order to reduce the weight of the first component 20.

FIG. 6:

The second component 16 comprises links 31, by which the second component 16 can be connected to the housing base 15, which is not shown.

FIG. 8:

The first component 20 is connected to the bearing bracket 4 via connecting elements 21. The base 15 is configured as one piece with the second component 16, which rests on the first component 20 via the elastic element 17. To prevent the second component 16 from lifting off the bearing bracket 4, that is, to move against the weight of the drum, the second component 16 comprises at least two pins 32, which can be configured like the pins 23 of the preceding Figures, but are held in the first component 20 by way of a spherical disk 33. In this way, it is possible to install the elastic element 17 under prestress due to the connecting elements 24. The required motion, that is, the freedom of motion, is ensured by means of the spherical configuration of the spherical disks 33. It is also feasible to arrange only one pin 32 or to utilize more than two pins.

FIG. 9:

The first component 20 is connected to the bearing bracket 4 via connecting elements 21. The housing 11 has, on the one hand, a flange-mount surface 34 for flange-mounting the driving motor 5 and, on the other hand, a flange-mount surface 35 for flange-mounting the drive to the drum 1, which is not shown. The seat 13 is configured for accommodating a water tank. The flange 14 is configured with ribs 36 in order to transmit the forces.

FIG. 10:

The first component 20 is connected to the second component 16, which is not shown, via connecting elements 24. The connecting elements 24 rest on spherical disks 33, which make possible the motion between the first component 20 and the second component 16.

FIG. 11:

The first component 20 is connected to the bearing block 4 via connecting elements 21. The pins 32 are connected to the first component 20 via connecting elements 24 and spherical disks 33. The first component 20 is configured as one piece with the base 15. The driving motor 5 is flange-mounted on the housing 11, but it is also possible to integrate the driving motor 5 in the housing 11.

| Reference numerals |
| --- |
| 1 drum |
| 2 bearing rollers |
| 3 drive |
| 4 bearing bracket |
| 5 driving motor |
| 6 inner bull gear |
| 7 spider gear |
| 8 outer gull gear |
| 9 planetary gear |
| 10 sun gear |
| 11 housing |
| 12 bearing |
| 13 seats |
| 14 flange |
| 15 base |
| 16 second component |
| 17 elastic element |
| 18 metal elements |
| 19 area |
| 20 first component |
| 21 connecting elements |
| 22 stop |
| 23 pin |
| 24 connecting element |
| 25 compensating device |
| 26 stop surface |
| 27 ring area |
| 28 bore |
| 29 recesses |
| 30 threaded bore |
| 31 links |
| 32 pins |
| 33 spherical disk |
| 34 flange-mount surface |
| 35 flange-mount surface |
| 36 ribs |

The invention claimed is:

1. A mixing drum drive comprising a driving motor (5) for driving a mixing drum (1), a housing (11) supporting a drum bearing (12) which facilitates rotation of the mixing drum (1), and the mixing drum drive further comprising a compensating device (25) comprising:

a first component (20) supported by a bearing bracket (4);
a second component (16) supported by the housing (11);
an elastic element (17) at least partially encased by the second component (16) and being located between the first component (20) and the second component (16);
the first component (20), the second component (16), the elastic element (17) and the bearing bracket (4) all being located vertically below a rotational axis of the mixing drum (1) so that the elastic element (17) is normally compressed by a weight of the housing (11) and the mixing drum (1); and
the elastic element (17) compensating for relative motion between the mixing drum (1) and the bearing bracket (4) during rotation of the mixing drum (1).

2. The mixing drum drive according to claim 1, wherein the compensating device (25) is connected, on one hand, to the bearing bracket (4) and, on another hand, to the housing (11).

3. The mixing drum drive according to claim 1, wherein the compensating device (25) has a mechanical stop which limits motions of the elastic element (17).

4. The mixing drum drive according to claim 1, wherein the first component (20) is connected to the bearing bracket (4) and the second component (16) is connected to the housing (11).

5. The mixing drum drive according to claim 1, wherein the second component (16) is configured as one piece with the housing (11).

6. The mixing drum drive according to claim 1, wherein the second component (16) has a cup-shaped configuration and encloses the elastic element (17).

7. The mixing drum drive according to claim 1, wherein the elastic element (17) has a metallic reinforcement core (18).

8. The mixing drum drive according to claim 1, wherein the first component (20) is connected to the bearing bracket (4) by connecting elements (21).

9. The mixing drum drive according to claim 1, wherein the compensating device (25) has an axial area (19) in which a contact surface between the first component (20), the second component (16), and the elastic element (17) is enlarged in order to absorb an axial force of the mixing drum (1).

10. The mixing drum drive according to claim 1, wherein the driving motor (5) drives an inner bull gear (6) of a planetary gear (9), an outer bull gear (8) of the planetary gear (9) forms the output and drives the mixing drum (1), and a sun gear (10) of the planetary gear (9) is fixedly connected to the housing (11), while the drum bearing (12) is arranged between the driving motor (5) and a spider gear (7).

11. The mixing drum drive according to claim 10, wherein the planetary gear (9) is arranged at least in part inside the mixing drum (1).

12. The mixing drum drive according to claim 1, wherein the compensating device is arranged between the bearing bracket (4) and the housing (11).

13. A mixing drum drive comprising a driving motor (5) for driving a mixing drum (1), a housing (11) supporting a drum bearing (12) which facilitates rotation of the mixing drum (1), and the mixing drum drive further comprising a compensating device (25) comprising:

a first component (20) supported by a bearing bracket (4);
a second component (16) supported by the housing (11);
an elastic element (17) being sandwiched between the first component (20) and the second component (16) and being at least partially surrounded by the second component (16);

the first component (20), the second component (16), the elastic element (17) all being located vertically below a rotational axis of the mixing drum (1), between the a housing (11) supporting the drum bearing (12) and the bearing bracket (4), so that the elastic element (17) is normally compressed by a weight of the housing (11) and the mixing drum (1); and the elastic element (17) compensating for relative motion between the mixing drum (1) and the bearing bracket (4) during rotation of the mixing drum (1).

14. A mixing drum drive including a compensating device (25) for supporting a mixing drum (1) rotatably driven by a drum driving motor (5) and rotatably supported by a drum bearing (12) supported in a housing (11), the compensating device (25) comprising:

a first component (20) located on an upper side of a bearing bracket (4);

a second component (16) located on a lower part of the housing (11);

an elastic element (17) located between the first component (20) and the second component (16) and enclosed by the second component (16), and the first component (20), the second component (16), the elastic element (17) and the bearing bracket (4) each being located below a rotational axis of the mixing drum (1) so that the elastic element (17) is normally compressed by weight of the housing (11) and the mixing drum (1); and the elastic element (17) compensating for relative motion between the drum (1) and the bearing bracket (4) during rotation of the mixing drum (1).

* * * * *